(12) United States Patent
Kutzner et al.

(10) Patent No.: US 6,704,620 B1
(45) Date of Patent: Mar. 9, 2004

(54) METHOD AND CONTROL DEVICE FOR CONTROLLING A GAS TURBINE SET, IN PARTICULAR IN GAS AND STEAM POWER STATIONS

(75) Inventors: Rüdiger Kutzner, Erlangen (DE); Dieter Simon, Mülheim a.d. Ruhr (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/601,492
(22) PCT Filed: Feb. 1, 1999
(86) PCT No.: PCT/DE99/00265
§ 371 (c)(1), (2), (4) Date: Oct. 2, 2000
(87) PCT Pub. No.: WO99/39249
PCT Pub. Date: Aug. 5, 1999

(30) Foreign Application Priority Data

Feb. 2, 1998 (DE) .......................... 198 04 026

(51) Int. Cl.$^7$ ............ G05D 17/00; G05D 3/12
(52) U.S. Cl. ..................... 700/287; 60/793
(58) Field of Search .................. 700/286–290, 700/275–285; 416/27–37; 60/39.21, 39.22, 39.24, 793, 224–226.3

(56) References Cited

U.S. PATENT DOCUMENTS

| | | | |
|---|---|---|---|
| 4,259,837 A | 4/1981 | Russell et al. | 60/39.55 |
| 5,115,638 A * | 5/1992 | Reed et al. | 60/39.281 |
| 5,305,230 A * | 4/1994 | Matsumoto et al. | 700/287 |
| 5,327,718 A * | 7/1994 | Iwata et al. | 60/773 |
| 5,487,265 A | 1/1996 | Rajamani et al. | 60/39.03 |
| 5,636,507 A * | 6/1997 | Rajamani et al. | 60/773 |
| 5,896,736 A * | 4/1999 | Rajamani | 60/773 |
| 6,167,690 B1 * | 1/2001 | Hepner et al. | 60/773 |
| 6,278,899 B1 * | 8/2001 | Piche et al. | 700/44 |

FOREIGN PATENT DOCUMENTS

| | | |
|---|---|---|
| DE | 24 47 632 | 4/1976 |
| DE | 28 51 871 | 6/1980 |
| EP | 0 642 707 | 3/1995 |
| WO | WO 93/24991 | 12/1993 |

OTHER PUBLICATIONS

Hu Xiao–Ping, "The Pressure, Flow Decoupling Control System of Hypobaric Chamber", Proceedings of the Annual International Conference of the Engineer in Medicine and Biology Society, Orlando, Oct. 31–Nov. 3, 1991, vol. 5, No. Conf. 13, Oct. 31, 1991, pp. 2183–2184.

Smith et al., "A Comparison of Multivariable Control Sequential Loop Closure Control in a Dynamic Structural Test System–Design and Implementation", Proceedings of the American Control Conference (ACC), Seattle, Jun. 21–23, 1995, vol. 2, Jun. 21, 1995, pp. 1474–1478.

Vegte, "Sequential Design of Multivariable Control SystemS", IEEE Proceedings D. Control Theory & Applications, vol. 138, No. 2, Mar. 1, 1991, pp. 103–110.

Patent Abstracts of Japan, vol. 009, No. 144 (P–365), Jun. 19, 1985 & JP 60 022204 A (Toshiba KK), Feb. 4, 1985.

Patent Abstracts of Japan, vol. 010, No. 247 (P–490), Aug. 26, 1986 & JP 61 075401 A (Toshiba Corp.) Apr. 17, 1986.

\* cited by examiner

Primary Examiner—Maria N. Von Buhr
(74) Attorney, Agent, or Firm—Eckert Seamans Cherin & Mellott, LLC

(57) ABSTRACT

In order to take account of coupling in the controlled systems and, in addition, regulating variable limitations and to permit reliable control of a gas turbine set, a method and a control device for controlling a gas turbine set is provided, in particular in gas and steam power stations, in which a regulating variable composed of a plurality of partial regulating variables is supplied to at least two servo elements of the gas turbine set, and in which the partial regulating variables for the individual regulating variables are formed from control deviations by means of individual transfer functions.

19 Claims, 3 Drawing Sheets

METHOD AND CONTROL DEVICE FOR CONTROLLING A GAS TURBINE SET, IN PARTICULAR IN GAS AND STEAM POWER STATIONS

BACKGROUND INFORMATION

The present invention relates to a method for controlling a gas turbine set, in particular in gas and steam power stations, a plurality of servo elements being employed. In addition, the present invention also relates to a control device operating in accordance with this method.

BACKGROUND INFORMATION

A gas turbine set is a gas turbine with a generator driven by it and—if necessary—a gearbox. Starting from a simple mechanical speed governor for a turbine and an electromechanical voltage regulator for a generator, the control devices employed in power stations, for example in gas and steam turbine installations, have been continuously improved in the course of time and adapted to the technological state of development.

In a conventional control method, the quantity of working medium flowing into the turbine is controlled by means of a turbine servo element, whose regulating variable is formed in a control circuit from the deviation between the actual output of the generator and a required output. The output, and with it the rotational speed of the generator, can therefore be controlled via the fuel quantity by means, for example, of the valve setting. In a further control circuit, a further regulating variable is formed from the deviation between the actual generator voltage and a required voltage and this further regulating variable is supplied to an exciter servo element controlling the exciter current or the exciter voltage of the generator. For this purpose, a voltage regulator can, for example, be employed which adjusts the terminal voltage of the generator by means of the excitation of the generator. The conventional control method is therefore based on control circuits which are separate from one another.

The acceptance of separate control circuits with decoupled controlled systems is permissible in the case of steam turbine sets with large thermal reservoirs provided the valves are not throttled down. The control circuits influence one another via the controlled systems built up from turbine, generator and a network fed by the generator. This can lead to the control circuits operating against one another during compensation procedures, with adverse effects on the overall control behavior. In order to compensate for this effect, a correcting variable, which is derived from the generator output, is supplied as a partial regulating variable to the exciter servo element in the conventional method. Compensation is provided for network fluctuations or changes to the slip frequency and output oscillations are damped by this means. Such output oscillations occur particularly in the case of power station installations which are coupled to an interlinking network via long lines. A circuit arrangement for damping outputoscillations in networks is described in, for example German Patent No. DE 28 51 871.

When a steam turbine is employed, the simplifying assumption of dynamic decoupling of the control circuits is still adequate for describing the overall system provided the valves are not throttled down. Where a gas turbine is used, on the other hand, undesirable coupling, which can lead to a reduction in the damping of the separate control systems, appears because of the relatively small delays or reaction times of the gas turbine as compared with the steam turbine. As an example, the bandwidth of the reactions to changes in the fuel flow in gas turbines extends into the boundary region of the generator dynamics so that the simplifying assumption of dynamic decoupling is no longer permissible. Such coupling problems also occur in the case of installations with a plurality of gas turbine sets, in particular in the case of gas and steam turbine installations. A certain influence of the control circuit of the turbine on the control circuit of the generator is achieved with the circuit arrangement described in DE 28 51 871 for damping output oscillations, is realized in a power system stabilizer damping. However, the two control circuits operate separately from one another.

Since each physical servo element, for example the valve or the exciter adjuster, has a limited regulation range, the individual servo elements can reach their limits due, for example, to regulator reactions initiated by faults or switching procedures in the network; this is always associated with a deterioration in the control behavior. The problem imposed by the limitation to the regulation range of the servo elements is even more serious in the case of multi-variable regulators because the limitations in one servo element also affect other regulating variables via the coupling in the controlled system and the regulator.

A method and a control device for controlling a turbine generator arrangement is described in European Patent No. EP 0 642 707 combining the individual regulators for rotational speed, output and voltage in a multi-variable control system is described. In the method and the control device in accordance with EP 0 642 707, changes in the controlled systems are taken into account by an adaptation strategy for the control parameters.

Particularly disadvantageous effects occur because changes in the controlled system during the operation of a power station are not always recognized unambiguously; they can therefore introduce stability problems. For this reason, the regulations of the Deutsche Verbundgesellschaft, for example, specify no switch-over of the control parameters during continuous operation.

Because of the continuing development of gas turbine technology, furthermore, there is a requirement in some cases for additional regulators, for example limiting value regulators, which supersede other regulators as soon as a regulating variable reaches its limit or as soon as physical limits to the operation of the gas turbine are exceeded. These regulators involve increased complexity, which also introduces complex changes in the regulator structure, which can in turn result in a deterioration in control quality.

SUMMARY

An object to the present invention is to provide a method for controlling a gas turbine set, in particular in gas and steam power stations, by means of which method account is taken of the coupling in the regulation sections and, in addition, regulating variable limits and which permits reliable control of the gas turbine set. An additional object is to provide an associated control device.

A method for controlling a gas turbine set, in particular in gas and steam power stations, is provided for the technical achievement of this object. According to this method a regulating variable composed of a plurality of partial regulating variables is supplied to at least two servo elements of the gas turbine set, the partial regulating variables for each individual regulating variable being formed from control deviations by means of individual transfer functions.

In an example configuration of the present invention, the regulating variables of all the servo elements of the gas turbine set can be composed of the same number of partial regulating variables. The number of partial regulating variables corresponds to the number of control deviations, each individual regulating variable being formed from the control deviations by means of individual transfer functions. Coupling in the controlled systems and, simultaneously, reliable control of the gas turbine set is therefore provided. By this means, multi-variable control which takes account of the couplings in the controlled system by corresponding transfer functions is provided in accordance with the present invention, which multi-variable control records all the section characteristics essential to the control system and, by this means, stabilizes each operating condition of the gas turbine set.

In accordance with an advantageous configuration of the present invention, therefore, at least one f the regulating variables is additionally composed of at least one of the further regulating variables. In accordance with a further advantageous development of the present invention, at least one partial regulating variable is formed from a regulating variable. By this means, the actual, under certain circumstances limited, regulating variables are also used for the control. In this arrangement, the actual regulating variable can be measured or the limit can be simulated in the regulator so that it does not require measurement. In this way, the information about a regulating variable limit is advantageously available to the partial regulating variables. By means of the method according to the present invention, therefore, it is possible to economize on the limiting value regulators previously used in the control system.

In order to improve the control in terms of the dynamics of the overall system, the difference between the required value and the actual value of the generator output, the generator voltage, the turbine temperature and the turbine rotational speed and, where the gas turbine set is coupled to an interacting network, the generator frequency are used as control deviations. For this purpose, the respective actual values, that is the generator output delivered, the generator voltage, the turbine temperature, the turbine rotational speed and/or, where the gas turbine set is coupled to an interacting network, the generator frequency are measured and the deviation of the same from the required values demanded is formed.

In accordance with a further example embodiment of the present invention, at least one servo element for adjusting the flow of a working medium flowing into the turbine, at least one servo element for generating an exciter current or an exciter voltage for the field winding of the generator and at least one servo element adjusting the guide vanes of a compressor are used for the gas turbine set.

The object of providing a control device operating in accordance with the method according to the present invention for controlling a gas turbine set, in particular in gas and steam power stations, is achieved by providing a control device to which actual and required values of the gas turbine set are supplied as input variables and which outputs regulating variables, respectively formed from a plurality of partial regulating variables, to the servo elements of the gas turbine set. The control device includes an arrangement for forming control deviations from the required and actual values, an arrangement for generating partial regulating variables from the control deviations and an arrangement for associating a plurality of partial regulating variables to form one regulating variable.

In accordance with an example embodiment of the control device according to the present invention, the arrangement for generating the partial regulating variables from the control deviations is a control algorithm which, for example, can be deposited in a read-only memory (ROM) or in some other suitable form. Individual transfer functions, which generate the partial regulating variables as a function of the control deviations, can thus be formed for each individual regulating variable. In this way, it is possible to take account in advance of all the characteristics of the controlled system to be controlled even during the design of the control device. A control device is therefore created which can deal with all the controlled systems on which the design is based even without technically programmed adaptation strategies to adjust control parameters.

DETAILED DESCRIPTION

Figure 1:
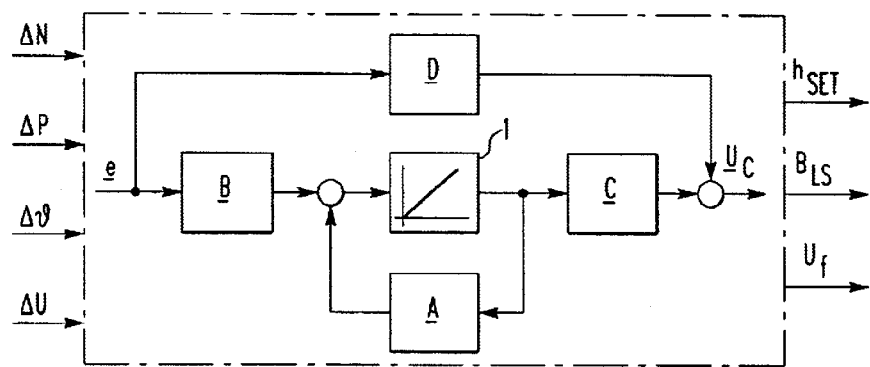
FIG. 1 shows, in a state-space realization a first example of the control system according to the present invention.

FIG. 1 shows, in a state-space realization, an embodiment example of the control system according to the present invention. In order to control a gas turbine set (not shown here), control deviations, in the present case the turbine rotational speed $\Delta n$, the generator output $\Delta P$, the turbine temperature $\Delta \theta$ and the generator voltage $\Delta U$, coordinated by the vector e, are supplied as input variables to the control system. As output variables, the control system supplies the regulating variables for the gas turbine set, coordinated in this case to form a vector $u_c$, for adjusting, in this case, the flow of a working medium flowing into the turbine of the gas turbine set by means of a valve or a number of valves $h_{set}$, for adjusting the guide vanes of a compressor of the gas turbine set $\beta_{LS}$ and for generating an exciter current or an exciter voltage for the field winding of the generator of the gas turbine set $u_f$. The regulating variables $u_c$ are composed of at least four partial regulating variables which are formed from the control deviations e by means of individual transfer functions, which are here represented by the four matrices A, B, C and D. In the present case, twelve individual transfer functions, which map the four control deviations of the vector e onto the three regulating variables of the vector $u_c$, are represented by the four matrices A, B, C and D. As may be seen from FIG. 1, partial variables obtained from the vector of the control deviations e by means of different matrices are supplied to a control element 1 for control purposes. All the controlled systems can be defined in advance by means of the different matrices A, B, C and D. The general vectorial representation of the state-space model as shown in FIG. 1, is generally favorable both for hardware and software realization of the control system. Thus all the system characteristics can be taken into account even during the design by means of the individual coefficients of the matrices A, B, C and D or corresponding system models can already be taken into account during the design by means of corresponding functions in the individual coefficient settings of the matrices. A cost-saving integration of all the control functions in one unit can therefore be quite simply realized. In this arrangement, the control element 1 is advantageously realized by a control algorithm and can, in this way, be quite simply modified.

Figure 2:
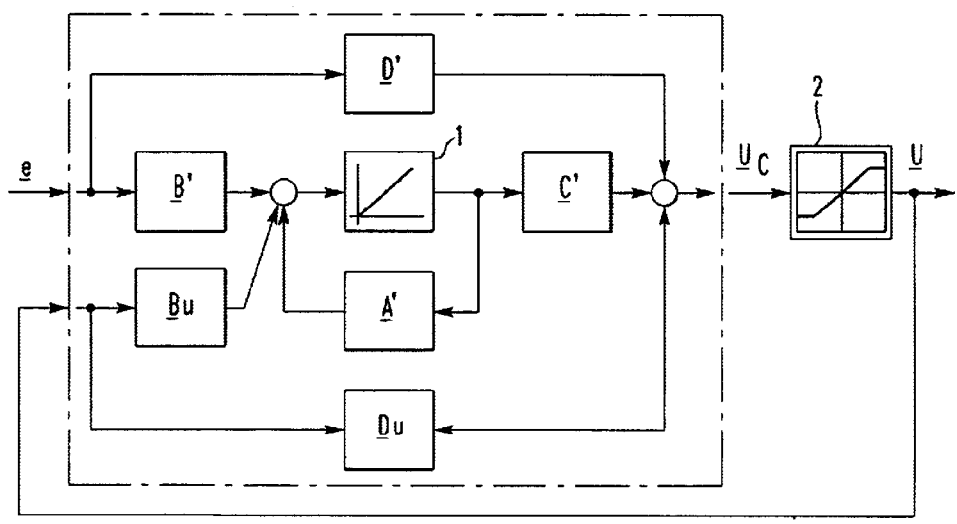
FIG. 2 shows, in a state-space realization a further embodiment example of the control system according to the present invention.

In the control system represented in FIG. 2, likewise in state-space model and as a supplement to those in FIG. 1, the actual, under certain circumstances limited, regulating variables, which are coordinated as the vector u, are also supplied as input variables in addition to the control deviations coordinated to form the vector e. In this arrangement, it does not matter whether the actual regulating variable is measured or whether the limit is simulated in the regulation system realization. The information on a regulating variable limitation is also therefore available to all the partial control functions. As compared with FIG. 1, the control system corresponding to FIG. 2 is supplemented by two further matrices, an input matrix Bu and a feed through matrix Du for the actual regulating variables. The individual transfer functions from the six matrices forming input variables have to be determined with respect to their coefficients and functions in such a way that in the unlimited case, that is when none of the regulating variables of the gas turbine set is subject to a limitation with regard to its regulation range, the function of the control system represented in FIG. 1 is maintained.

The control system represented in FIG. 2 provides a state regulator which has an observer estimating the behavior of the controlled system and which contains state feedback. Overshoot limitation methods, so-called anti-wind-up methods, are suitable for such a control system. These, for example, modify the control algorithm of the control element 1 in such a way that observation errors are avoided despite a regulating variable limit here represented by the limiting element 2. This makes it possible to economize on limiting value regulators. Thus, for example, an exhaust gas temperature regulator can supersede an output governor by utilizing the regulating range of compressor inlet guide vanes while, for example, the guide vane regulator remains within its limit. In this way, better utilization of the operating range of the gas turbine of a gas turbine set can be achieved.

Figure 3:
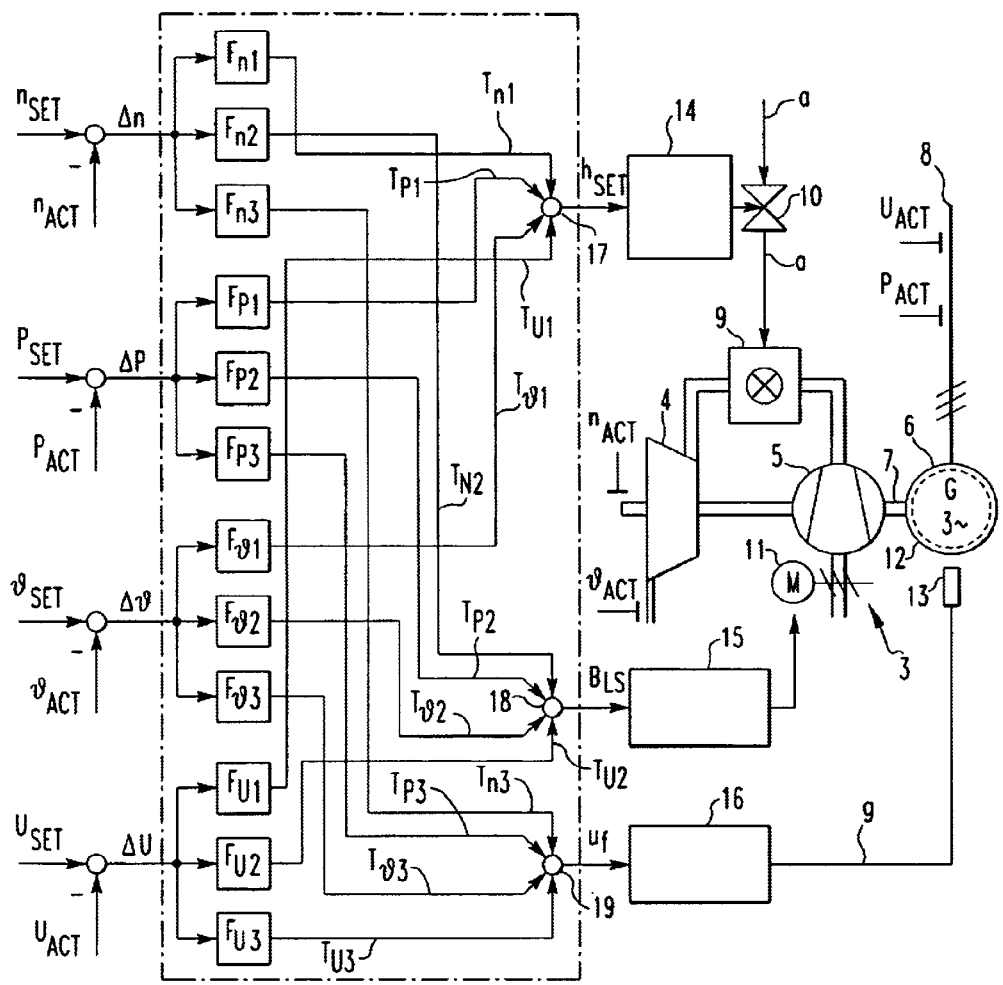
FIG. 3 shows, in a block circuit diagram, an embodiment example of a control device according to the present invention.

FIG. 3 shows a block circuit diagram of a control device, according to the invention, for a gas turbine set 3 comprising a turbine 4, a compressor 5 and a generator 6. The turbine 4 drives the generator 6 via a shaft 7. In this arrangement, air is taken in from the atmosphere by means of the compressor 5 and is supplied to the combustion chamber, which is designated by 9. The working medium a flowing in under pressure reacts there with the oxygen contained in the air. This gas mixture then expands in the gas turbine 4 with an output of work. The generator 6 feeds into a supply network 8 in cases where it is connected to the latter by means of a closed block switch (not shown here) and a block transformer (likewise not shown here).

A servo element in the form of a valve 10 or a number of valves is provided for adjusting the flow of the working medium a flowing into the gas turbine 4.

A motor 11 or a number of motors, which vary the angular setting of the guide vanes of the compressor 5, are here provided as the servo element for adjusting the guide vanes of the compressor 5.

The rotating exciter part 12 of the generator 6 is excited by a field winding 13 arranged in the stator. An auxiliary exciter (not shown here) feeds the field winding 13 by means of an exciter servo element, for example in the form of a thyristor set. In this arrangement, the exciter servo element forms the variable direct current or excitation current g necessary for the excitation. In this arrangement, the generator is excited by the field winding in the rotor, which is directly supplied with current from a thyristor set via slip rings. As an initial alternative, the thyristor set can be a main excitation machine which also rotates and supplies the field winding of the generator with current via rectifiers.

The control deviations, which are respectively formed from specified required and measured actual values by difference formation, of the turbine rotational speed $\Delta n$, the generator output $\Delta P$, the turbine temperature $\Delta \theta$ and the generator voltage $\Delta U$, are supplied to the control device. The generator frequency f can also be employed additionally to or as an alternative to the turbine rotational speed n. Further variables can likewise be employed as input variables, for example further control deviations, regulating variables, limiting regulating variables, instructions from a power station control station and the like.

Partial regulating variables $T_{n1}$, $Tn_2$, $T_{n3}$, $T_{P1}$, $T_{P2}$, $T_{P3}$, $T_{\theta 1}$, $T_{74\ 2}$, $T_{\theta 3}$, $T_{U1}$, $T_{U2}$ and $T_{U3}$ are formed from the control deviations $\Delta n$, $\Delta P$, $\Delta \theta$ and $\Delta U$ by means of individual transfer functions $F_{n1}$, $F_{n2}$, $F_{n3}$, $F_{P1}$, $F_{P2}$, $F_{P3}$, $F_{\theta 1}$, $F_{\theta 2}$, $F_{\theta 3}$, $F_{U1}$, $F_{U2}$ and $F_{U3}$. Regulating variables $h_{required}$, $\beta_{LS}$, $u_f$ for the regulating elements 10, 11 and 13 of the gas turbine set 3 are subsequently formed from four partial regulating variables in each case by means of the association elements 17, 18, 19. The regulating variables $h_{required}$, $\beta_{LS}$, $u_f$ are supplied to a valve setting regulator 14 for the valve 10, a position regulator 15 for the motor 11 for guide vane setting of the compressor 5 and to an exciter regulator 16, for example a thyristor regulator, for generating an exciter current for the field winding 13 of the generator 6. Because of the complexity of the control device, and particularly because of the twelve individual transfer functions $F_{ki}$, a computer-supported algorithm may be used for control. In this arrangement, the control algorithm also takes account of the case where a control variable reaches a limiting value or where, for example, only the regulator 14 controlling the valve 10 is active during a starting procedure of a power station installation. Switching over to combined control, which comes into action in the case of a feed to the exciter part 12 via the field winding 13 and therefore during the build-up of the generator voltage U, is completely taken into account by means of the transfer functions and is therefore possible at any time. Communication between the servo elements of the gas turbine set, i.e. between the valve 10, the motor 11 and the field winding 13, is provided by the individual transfer functions $F_{ki}$.

Because all the essential controlled system characteristics are taken into account by the transfer functions $F_{ki}$ by means of corresponding system models, the control device is insensitive and quite robust with respect to changes in the controlled system. Changes in the controlled system during operation due, for example, to wear of or dirt on components, operating point displacements and network switching can already, in this way, have been taken into account during the design of the control system so that all possible operating cases can have already been stabilized in advance by the control device. The control device can already, therefore, have been dimensioned in advance in such a way that specified control qualities, for example, can be maintained or achieved without difficulty.

Figure 4:
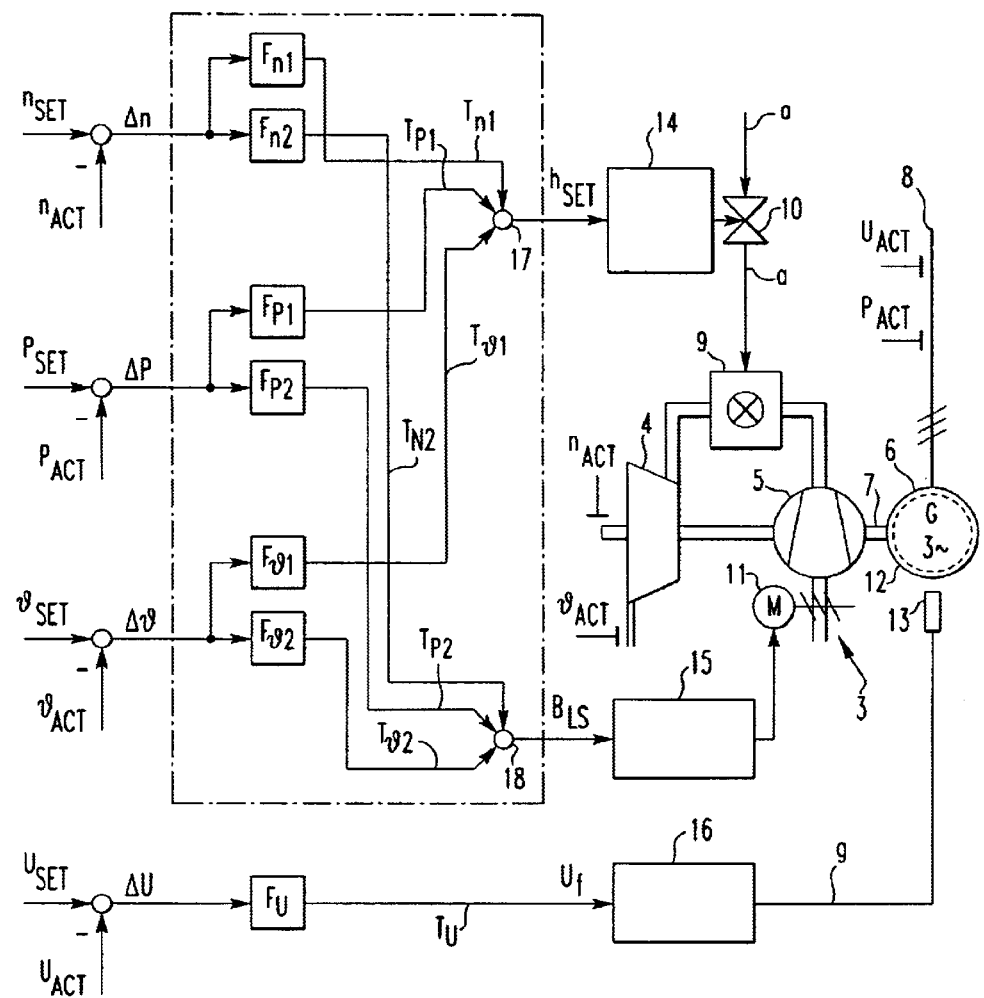
FIG. 4 shows a modification of FIG. 3 with two coupled servo elements.

In FIG. 4, the embodiment example of FIG. 3 has been modified to the extent that only the two servo elements 14 and 15 have been coupled together in terms of their regulating variables. In this case, the partial regulating variables $T_{ki}$, with k=n, P, $\theta$ and i=1 or 2 are respectively formed from the control deviations $\Delta n$, $\Delta P$ and $\Delta \theta$ by transfer functions $F_{ki}$ and these partial regulating variables have the regulating variables $h_{required}$ and $\beta LS$ superimposed on them by suitable means in accordance with FIG. 3. The control deviation ΔU for the voltage regulation is provided, in this case, by means of the transfer function $F_u$ directly as a setting variable $U_f$ on the servo element 16 for the generator voltage.

For the case where, corresponding to FIG. 3, partial regulating variables are supplied to each servo element of the control device, the number of partial regulating variables follows advantageously from the number of the control deviations present at the inputs. As an example, four partial regulating variables occur in the case of four control deviations Δn, ΔP, Δθ and ΔU in FIG. 3 for each of the three servo elements 14, 15 and 16. $T_{ki}$, where k="type of the control deviations" and i="designation" of the individual servo element, is therefore generally valid for the partial regulating variables.

What is claimed is:

1. A method for controlling a gas turbine set, the gas turbine set employing servo elements, comprising:

forming partial regulating variables for individual regulating variables, the partial regulating variables being formed from control deviations using individual transfer functions, the individual regulating variables being composed of a plurality of the partial regulating variables; and supplying a respective one of the individual regulating variables to at least two of the servo elements of the gas turbine set.

2. The method according to claim 1, wherein the gas turbine set is used in gas and steam power stations.

3. The method according to claim 1, wherein each respective one of the individual regulating variables is composed of a same number of the partial regulating variables.

4. The method according to claim 3, wherein the number of partial regulating variables corresponds to the number of control deviations.

5. The method according to claim 1, wherein at least one of the partial regulating variables is formed from at least one of the individual regulating variables.

6. The method according to claim 1, wherein at least one of the partial regulating variables is formed from at least one of the individual regulating variables using at least one transfer function.

7. The method according to claim 1, wherein at least one of the individual regulating variables is additionally composed of at least another of the individual regulating variables.

8. The method according to claim 1, wherein a difference between a required value and an actual value of a generator output is used as at least one of the control deviations.

9. The method according to claim 1, wherein a difference between a required value and an actual value of a generator voltage is used at as at least one of the control deviations.

10. The method according to claim 1, wherein a difference between a required value and an actual value of at least one of a generator frequency and a turbine rotational speed is used as at least one of the control deviations.

11. The method according to claim 1, wherein a difference between a required value and an actual value of a turbine temperature is used as at least one of the control deviations.

12. The method according to claim 1, further comprising:

using at least one of the servo elements to adjust a flow of a working medium flowing into a combustion chamber of a turbine of the gas turbine set.

13. The method according to claim 1, further comprising:

using at least one of the servo elements to generate an exciter current for a field winding of a generator of the gas turbine set.

14. The method according to claim 1, further comprising:

using at least one of the servo elements to adjust guide vanes of a compressor of the gas turbine set.

15. A control device for controlling a gas turbine set, the gas turbine set employing servo elements, the control device comprising:

a first arrangement to generate partial regulating variables from control deviations; and a second arrangement to associate a plurality of the partial regulating variables to form at least one regulating variable, the at least one regulating variable being supplied to at least one of the servo elements.

16. The control device according to claim 15, further comprising:

a third arrangement to form the control deviations from required and actual values.

17. The control device according to claim 15, wherein the first arrangement includes computer-supported algorithms.

18. The control device according to claim 15, wherein the first arrangement includes an overflow limitation.

19. The control device according to claim 18, wherein the overflow limitation is formed by an anti-wind-up control algorithm.

* * * * *